(12) United States Patent
Hornung (10) Patent No.: US 12,330,549 B2
(45) Date of Patent: Jun. 17, 2025

(54) TRANSPORT CART FOR PIECE GOODS (71) Applicant: AGRARSYSTEME HORNUNG GMBH & CO. KG, Unterschneidheim-Zoebingen (DE)

(72) Inventor: Hubert Hornung, Unterschneidheim-Zobingen (DE)

(73) Assignee: AGRARSYSTEME HORNUNG GMBH & CO. KG, Unterschneidheim-Zoebingen (DE)

( * ) Notice: Subject to any disclaimer, the term of this patent is extended or adjusted under 35 U.S.C. 154(b) by 838 days.

(21) Appl. No.: 17/624,012

(22) PCT Filed: Jul. 1, 2020

(86) PCT No.: PCT/EP2020/068487
§ 371 (c)(1),
(2) Date: Dec. 30, 2021

(87) PCT Pub. No.: WO2021/001413
PCT Pub. Date: Jan. 7, 2021

(65) Prior Publication Data
US 2022/0348130 A1 Nov. 3, 2022

(30) Foreign Application Priority Data
Jul. 4, 2019 (DE) ............... 10 2019 118 107.0

(51) Int. Cl.
*B60P 7/00* (2006.01)
*B60P 7/08* (2006.01)
(52) U.S. Cl.
CPC ........... *B60P 7/0846* (2013.01); *B60P 7/0853* (2013.01)
(58) Field of Classification Search
CPC ..... B60P 7/0853; B60P 7/0846; B60P 7/0823; B62D 33/02

(Continued)

(56) References Cited

U.S. PATENT DOCUMENTS 7,189,042 B1 3/2007 Schmit
8,226,150 B1 7/2012 Schmeichel et al.
(Continued)

FOREIGN PATENT DOCUMENTS

CN 207670281 U 7/2018
DE 20 2007 019 318 U1 12/2011
(Continued)

OTHER PUBLICATIONS

Office Action received for Chinese Patent Application Serial No. 202080054079.X, dated Apr. 13, 2024, 12 pages, CN.

(Continued)

*Primary Examiner* — Steven O Douglas
(74) *Attorney, Agent, or Firm* — NOD Law PC (57) ABSTRACT

A transport wagon with a loading platform configured to have a loaded state, wherein in the loaded state, cargo may be loaded onto the loading platform and wherein the loading platform extends along a longitudinal axis; a strapping system configured to secure the cargo on the loading platform, wherein the strapping system comprises at least one tensioning means configured to be guided, with the aid of a conveying device, at least partially around the cargo loaded onto the loading platform thereby tensioning the cargo against the loading platform; wherein the loading platform is delimited at a frontal end by transverse side parts comprising the conveying device of the strapping system; and wherein the at least one tensioning means is affixed to the transport wagon and configured to move along the longitudinal axis relative to the loading platform.

20 Claims, 8 Drawing Sheets (58) Field of Classification Search
USPC .................................. 410/97, 197, 12, 100
See application file for complete search history.

(56) References Cited

U.S. PATENT DOCUMENTS

| | | | | |
|---|---|---|---|---|
| 8,342,784 | B2* | 1/2013 | Crane | ................ B65D 90/0033 410/46 |
| 9,925,910 | B2 | 3/2018 | Hornung | |
| 2005/0111929 | A1 | 5/2005 | Tessier et al. | |
| 2012/0261939 | A1 | 10/2012 | Schmeichel et al. | |
| 2016/0121781 | A1 | 5/2016 | Hornung | |
| 2016/0167563 | A1 | 6/2016 | Nelson et al. | |
| 2018/0105093 | A1* | 4/2018 | Wood | ................ B60P 7/0869 |

FOREIGN PATENT DOCUMENTS

| | | |
|---|---|---|
| DE | 10 2011 010 379 A1 | 8/2012 |
| DE | 202013005936 U1 | 9/2013 |
| DE | 10 2013 208 659 A1 | 11/2014 |
| DE | 20 2015 005 847 U1 | 9/2015 |
| EP | 2 994 346 B1 | 9/2019 |
| FR | 2268669 A1 | 11/1975 |
| FR | 2676692 A1 | 11/1992 |
| JP | 09226450 A | 2/1997 |
| JP | 2006143048 A | 8/2006 |
| JP | 2007001396 A | 1/2007 |
| KR | 20-1998-0052359 | 10/1998 |
| KR | 100872055 B1 | 11/2008 |
| WO | 2012/104105 A1 | 8/2012 |
| WO | 2018/053582 A1 | 3/2018 |

OTHER PUBLICATIONS

International Search Report and Written Opinion received for International PCT Application PCT/EP2020/068487 dated Feb. 5, 2021, 24 pages (Including English Translation).
Search Report received for German Patent Application Serial No. 102019118107.0 dated Mar. 13, 2020, 7 pages (Original Copy).
Japanese Patent Office, "Office Action for Japanese Patent Application No. 2022-500547," May 21, 2024; 5 pages, Japanese Patent Office, JP.
"Final Office Action" issued in related Japanese Patent Application No. 2022-500547, Dated: Aug. 27, 2024.
"Notice of Preliminary Rejection", issued in corresponding Korean Patent Application No. 10-2022-7002096, dated Jan. 24, 2025 (English translation not available).

* cited by examiner

TRANSPORT CART FOR PIECE GOODS

FIELD OF THE INVENTION

The present disclosure relates generally to cargo transportation. In particular, but not by way of limitation, the present disclosure relates to systems, methods and apparatuses for a transport wagon for transporting cargo comprising a loading platform with at least one tensioning means and a strapping system.

BACKGROUND OF THE INVENTION

The term "transport wagon" as used herein encompasses all vehicle types, including heavy goods vehicles and the like, and also includes trailers and trailer systems for such vehicles.

A transport wagon's cargo is typically loaded onto a loading platform and subsequently secured by straps. Commonly, straps are provided at regular intervals, which are normally wrapped around the loading platform and cargo and tension the cargo against the loading platform. In practice, however, this method for securing cargo using individual straps that must be separately attached and tensioned, is time-consuming and thereby a significant drawback. Moreover, two operators and/or users are often required in order to wrap and tighten the individual straps around the cargo. There is therefore a need in the art for an improved transport wagon system for cargo.

In light of this need, DE 20 2007 019 318 U1 discloses a transport wagon for cargo, which, instead of a strapping system for securing the cargo arranged on the loading platform, provides movable side walls that secure the cargo. Specifically, the 318' patent discloses a transport wagon, wherein at least one of the longitudinal side walls have a support device by which the at least one longitudinal side wall is able to move from an open position close to the ground into a closed position gripping at least an upper layer of the stacked cargo and laterally securing it. This solution's drawback is that this system only functions when the lower bale layers (i.e. the bale layers close to the platform) are not considerably wider than the upper bale layers and is therefore less flexible in comparison to the strapping method for securing cargo.

Yet another method for securing cargo is disclosed in DE 10 2011 010 379 A1. The 379' patent proposes a device for the simple securing of stacks of goods with the aid of securing straps, wherein the device comprises at least two guide rails which are arranged above the load to be secured; at least two mounting rails which are provided in a mounting position; and, at least two transfer rails which are able to be moved from a first position in which the transfer rails are aligned with the mounting rails into a second position in which the transfer rails are aligned with the guide rails, and are movably displaceable in the rails for holding at least one securing strap. The securing straps are arranged over the load such that the free ends of the securing straps hang down laterally next to the load and the free ends of the securing straps are locked to a loading floor and at the same time released from a holding device that holds them from the associated rails. This relatively complex rail arrangement may be arranged in a warehouse and the secured load may be moved along the rail arrangement to be strapped. However, a drawback to this method is that the claimed rail arrangement is separate and distinct form the transport wagon and cannot be utilized in every situation, such as, for example, for agricultural use in a field.

Furthermore, it is common to cover opened heavy goods vehicle trailers by means of a tarpaulin to protect the load from the elements (cf. also U.S. Pat. No. 8,226,150 B1). Another method for protecting loaded goods, for example hay bales, on the loading platform from rain by means of a tarpaulin is disclosed in U.S. Pat. No. 7,189,042 B1, wherein a covering sheet is unrolled laterally on a supporting frame surrounding the loading platform. Load-securing straps can additionally be guided around the load. The loading platform is laterally delimited only by the vertical struts of the frame.

Finally, EP 14 703 844.2 discloses a transport wagon in which rapid securing of the loaded cargo can be achieved by way of a driven strapping system. This system allows for reliable and simple securing of a cargo load with a uniformly loaded loading surface. However, it has been found that there is additionally a need for a solution which allows the cargo to be secured in particular also when the loading surface is only partially loaded. In addition, it is desirable to be able to use the transport wagon for very different cargoes and thus also very different loading heights.

Thus, a need has arisen to provide the advantages of flexible straps for securing cargo without the need to accept the drawbacks associated therewith in practice.

SUMMARY

Embodiments disclosed herein address the above stated needs by disclosing a cargo wagon comprising a loading platform with at least one tensioning means and strapping.

BRIEF DESCRIPTION OF THE DRAWINGS

The objects, features, and attendant advantages of the present disclosure are fully appreciated as the same becomes better understood when considered in conjunction with the accompanying drawings, which in like reference characters designate the same or similar parts through the several views shown.

DETAILED DESCRIPTION

The present disclosure relates generally to cargo transportation. In particular, but not by way of limitation, the present disclosure relates to systems, methods and apparatuses for a transport wagon for transporting cargo comprising a loading platform with at least one tensioning means and a strapping system. The transport wagon has a loading platform that is capable of engaging under the cargo in the loaded state of the transport wagon, and a strapping system that allows the cargo to be secured on the loading platform and comprises at least one tensioning means which can be guided, with the aid of a conveying device, at least partially around the cargo loaded on the loading platform. The invention can tension the loaded cargo against the loading platform. Furthermore, the loading platform is delimited at its frontal ends by transverse side parts which comprise the conveying device of the strapping system. In this case, it is possible for the conveying device of the strapping system to be provided only on one of the two transverse side parts or on both transverse side parts.

According to an embodiment of the present invention, the at least one tensioning means is fastened to the transport wagon so as to be movable in the direction of the longitudinal axis relative to the loading platform. Thus, in particular when the loading platform is only partially loaded, the at least one tensioning means can be moved in the direction of the loaded region. Regions of the loading platform that are not loaded do not need to be secured by means of a tensioning means. When there are a plurality of tensioning means, it is equally possible to move the individual tensioning means separately in order in this way to provide an ideal arrangement adapted to the actual loaded state of the loading platform. In particular, it is possible in this case for the spacings of the tensioning means to be varied in the direction of the longitudinal axis and for regions of the loading platform that are not loaded to be left out.

It is alternatively or additionally conceivable to also provide the conveying device of the strapping system on one or both of the longitudinal side parts of the transport wagon.

It is possible, for example, to use a tensioning strap as tensioning means. Alternatively, however, it is conceivable to design the tensioning means in the form of a net-like structure or even a membrane and this may be advantageous depending on the loaded cargo. A membrane can in this case additionally take on the function of protecting the enclosed cargo from external influences, for example rain.

The use of a plurality of tensioning straps as tensioning means has proven expedient inasmuch as tensioning straps that are already known may be used for embodiment of the present invention, wherein the particularity of the embodiments can be considered to be that these tensioning straps can be guided around the cargo at least partially with the aid of a common conveying device and tensioned.

Therefore, with this embodiment, it is no longer necessary for the user to wrap and secure each individual tensioning strap separately around the cargo. Rather, this is carried out by a common conveying device, and so it is even possible for an individual user to secure the loaded cargo on the transport wagon easily and quickly without the help of a second user.

The tensioning means as proposed is advantageous over the grid structure as disclosed in DE 20 2007 019 318 U1, because they are built to be relatively lightweight and dimensionally flexible and can be replaced easily and cost-effectively, if necessary, in the event of damage.

Provision may furthermore be made that the at least one tensioning means of the strapping system is arranged along one of the longitudinal sides of the loading platform and can be guided with the aid of the conveying device at least partially in a direction transversely to the longitudinal extent of the transport wagon around the cargo loaded on the loading platform. As is set out in more detail below, it is not necessary for the at least one tensioning means to be guided entirely around the cargo loaded on the loading platform. Alternatively, it may also be sufficient to enclose an angle of, for example, about 120° and at the same time still ensure that the cargo is sufficiently secured. The decisive factor is that the cargo is secured by being braced against the loading platform.

In order to allow the at least one tensioning means to be movable in the direction of the longitudinal axis of the loading platform relative to the loading platform, provision may be made that the at least one tensioning means is movably attached to a guide rail or the like, which extends substantially along the longitudinal axis of the loading platform. Depending on the configuration of the invention, it is also possible to use, as guide rail, components which are provided anyway and extend substantially along the longitudinal axis of the loading platform.

In alternative embodiments of the present invention, provision may be made that the at least one tensioning means is able to be variably coupled to and uncoupled from the conveying device. In this embodiment, it is thus possible for tensioning means that are not required not only to be shifted into another region from a region in which no loading of the loading platform takes place and thus no securing is required, but optionally also to be simply uncoupled from the conveying device. In the uncoupled state, the tensioning means are thus not guided around the loading platform and the cargo loaded thereon, but remain in an inactive position, for example in a rolled-up state.

The variable coupling and uncoupling also allows the tensioning means which have been moved in terms of their position relative to the loading platform to be coupled to the conveying device again at a corresponding likewise shifted point of the latter, in order to allow the tensioning means to be oriented as far as possible at right angles relative to the longitudinal axis of the loading platform. For this purpose, the conveying device may have a plurality of fastening points distributed along the longitudinal axis, at which the at least one tensioning means is able to be variably coupled to and uncoupled from the conveying device. If there are a plurality of tensioning means, it may, analogously hereto, be advantageous to provide more fastening points than tensioning means.

In this case, each of the fastening points of the conveying device may have a resiliently pretensioned fastening member which is capable of cooperating with a corresponding recess in the tensioning means in order to fasten the tensioning means. This system may be similar for example to the configuration of seat belts in motor vehicles. Of course, it is also conceivable to provide a reversed design in which a resiliently pretensioned fastening member is provided on the tensioning means, said fastening member cooperating with a corresponding recess at the fastening point. A pin, a hook or the like can be provided as fastening member. This can be integrated in an associated closing mechanism into which a closing means with a corresponding recess can be plugged.

Alternative configurations in which, for example, the fastening member is not resiliently preloaded are likewise conceivable.

The strapping system may furthermore have a tensioning device for tensioning the at least one tensioning means. If there are a plurality of tensioning means, these can be tensioned with a single tensioning device. Alternatively, it is also conceivable for respective tensioning devices to be assigned to each tensioning means or to a limited number of tensioning means, for example two, three or four tensioning means.

Furthermore, the tensioning device may have a tensioning shaft which is rotatable about its longitudinal axis and on which the at least one associated tensioning means is able to be at least partially wound and unwound. For example, the tensioning shaft may have at least one slot-like opening through which the at least one tensioning means is capable of extending. As an alternative to a slot-like opening, the tensioning device can have a tensioning bracket for winding up the at least one tensioning means. This solution is particularly simple in the production and implementation of the transport wagon. The tensioning means is wound onto the tensioning shaft with the aid of the tensioning bracket.

Alternatively or additionally, the tensioning device may comprise a shaft for tensioning the tensioning means, wherein the at least one tensioning means is able to be wound onto or unwound from the axle by rotating the latter about its longitudinal axis. The shaft in this case fulfills the function of tensioning or, in a design variant in which a tensioning shaft is additionally fitted, of pretensioning.

Alternatively or additionally, the tensioning device may comprise a hollow shaft and an axle arranged therein, wherein the at least one tensioning means is able to be wound and unwound by rotating the axle relative to the hollow shaft. In this design variant, the axle and hollow shaft fulfill the function of tensioning or, in a design variant in which a tensioning shaft is additionally fitted, of pretensioning the tensioning means. In this case the hollow shaft preferably has at least one slot-like opening through which a free end of the at least one tensioning means is capable of projecting to the outside.

Consequently, the tensioning device serves, in all design variants, to tension the at least one tensioning means as soon as the latter is guided with the desired wrapping angle around the loaded cargo. In this case, the at least one tensioning means may, for example in a configuration with a hollow shaft and an axle received therein, be wound by rotation of the axle relative to the hollow shaft surrounding it. In practice, the axle is rotated regularly and the tensioning means wound onto the axle, while the hollow shaft does not rotate. In the wound state, the at least one tensioning means, with the exception of its free end which projects to the outside through a corresponding opening in the hollow shaft, is almost entirely received inside the hollow shaft. In this way, particularly uncomplicated and secure storage of the tensioning means of the strapping system is also provided. In principle, however, it is alternatively also conceivable for the hollow shaft to rotate or for the tensioning means to be wound onto the external hollow shaft.

The at least one tensioning means may be connected for conjoint rotation, at least with one end portion, to a component of the tensioning device, with the result that the rotation of the shaft, the axle or the hollow shaft causes the at least one tensioning means to be wound on and, in reverse, the unwinding of the at least one tensioning means causes the shaft, the axle or the hollow shaft to rotate.

In one embodiment, which comprises only the tensioning shaft for tensioning the tensioning means, the tensioning means can be wound on and/or unwound from the tensioning shaft by rotating the latter Furthermore, in a region in which the at least one tensioning means is able to be wound onto and unwound from a component of the tensioning device, the tensioning device may provide a greater degree of static friction between this component of the tensioning device and the tensioning means.

The tensioning device may furthermore comprise at least one drive unit which serves to drive the rotating part of the tensioning device, for example the axle arranged in the hollow shaft, the shaft or the tensioning shaft, and initiates the relative rotational movement. The drive unit in this case replaces a manual drive by a user, for example a crank or the like, and as a result allows even more convenient operation of the strapping system.

If there are a plurality of tensioning means and a plurality of driven tensioning devices, it is also possible for a controller to be provided, which allows variable actuation of the individual tensioning devices as required.

The hollow shaft may, as a whole, have a single slot-like opening through which all the free ends (when there are a plurality of tensioning means) extend, or respective openings assigned to each tensioning means. The same goes for the at least one slot-like opening in the tensioning shaft, through which the tensioning means is capable of extending through the tensioning shaft.

Furthermore, the tensioning device may have an overload safety device such that tensioning and/or winding on of the at least one tensioning means is possible only up to a predetermined threshold value. If this threshold value (for example a tensile force value of about 25 N) is exceeded, the overload safety device prevents the torque that is introduced by the drive unit or manually by the user from being transmitted to the at least one tensioning means. The overload safety device may be configured for example in the manner of a ratchet coupling, a torque limiter or the like, and ensures that the tensioning means are not subjected to an inadmissibly high tensile force. In this way, the service life of the tensioning means can be increased.

In an alternative embodiment of the present invention, the overload safety device may be provided, for example, at the interface of the drive unit and the rotating component of the tensioning device, for example the shaft or axle, and interrupt the force transmission from the drive unit to the shaft or axle when said shaft or axle is stationary on account of the tensile forces acting on the tensioning means. In this case, when there are a plurality of tensioning means, none of the tensioning means would have to be retensioned anymore.

Rather than an overload safety device in the region of the interface of the drive unit and the shaft or axle, provision may also be made, however, that each tensioning means is provided with an overload safety device in the connecting region to the rotating component of the tensioning device. In this way, the individual tensioning means of the strapping system can be tensioned to a predetermined maximum tensile force independently of one another, this being advantageous in particular when the loading platform is not uniformly loaded with cargo. One conceivable embodiment provides, for example, strap-like tensioning means which can be wound onto strap rollers, wherein each strap roller is connected to the shaft or axle via an overload safety device (ratchet coupling). If the tensile force acting on a strap exceeds a particular threshold value, the ratchet coupling slips, and so the rotational movement of the shaft or axle is no longer transmitted to the associated strap roller.

Alternative embodiments to the abovementioned systems of an overload safety device are conceivable.

In yet another embodiment, at least one component of the tensioning device serves to pretension the at least one tensioning means, in particular the tensioning shaft, to secure the at least one pretensioned tensioning means. Thus, as set out above, the tensioning device can be protected by an overload safety device from an overload of the system as a result of the rotational movement for winding and unwinding the tensioning means. This has the result, however, that if the transport wagon inadvertently overturns, the overload safety device gives way on account of the load of the cargo, which has likewise overturned, and as a result the load is no longer secured. However, it is specifically in such cases that additional securing of the load is desirable. To this end, the tensioning shaft may be used as an additional component of the tensioning device.

After a tensioning process has been carried out by means of the shaft, axle and hollow shaft, or other components that are conceivable as pretensioners with an overload safety device, the tensioning shaft is likewise rotated through a predetermined angle, for example through 180° about its longitudinal axis. The at least one tensioning means extends through the slot-like opening through the tensioning shaft and the rotation of the latter causes it to bear directly against the outer surface of the tensioning shaft. As set out above, the latter may be provided at least partially with a coating, a surface structure or with additional elements (for example spikes or rubber elements) which provide greater static friction of the bearing tensioning means. In this way, the at least one tensioning means is secured in its tensioned state by the existing static friction on the tensioning shaft.

The tensioning shaft itself may be fixed mechanically in this securing position, for example by a holding pin which is engaged both with the tensioning shaft and with a stationary part of the transport wagon. Alternatively, the securing may also take place via the drive of the tensioning shaft. A hydraulic drive of the tensioning shaft is conceivable for example, wherein a locking valve holds the tensioning shaft thereon in the securing position. Alternatively or in combination with the hydraulic drive, a toothed rod may also be used, which is in turn mechanically fixed in a position in which the tensioning shaft is located in its securing position.

Independently of the type of securing, if there are a plurality of securing means and a plurality of tensioning devices, provision may also be made for a controller to additionally be provided, which allows variable actuation of the individual tensioning devices for securing as required. Even in the case of mechanical securing, for example by means of a holding pin, separate securing can be assigned to each tensioning device or each tensioning means.

Provision may furthermore be made that the conveying device comprises at least one guide rope and/or guide bar, to which the at least one tensioning means is able to be connected such that it can be guided by means of the guide rope and/or the guide bar at least partially around the cargo loaded onto the loading platform.

In this alternative embodiment, it is possible, for example, for the free end of the at least one tensioning means to be connected to the guide rope or the guide bar. If a plurality of tensioning means are provided, this logically has the result that, in the event of the guide rope or the guide bar being displaced, all tensioning means connected thereto can likewise be displaced accordingly, and so the effect according to the invention is achieved that the individual tensioning means do not have to be guided separately around the cargo.

In the embodiment with a guide bar, the guide bar may comprise the tensioning device or components thereof for tensioning or securing the at least one tensioning means. In this way, functional combining of the guide bar and the tensioning device can be achieved, with the result that, on account of a lower number of individual parts, the strapping system can be produced more easily and more cost-effectively.

The conveying device may furthermore comprise at least one, preferably two, holding arms for guiding and holding the guide rope or the guide bar, wherein the at least one holding arm is arranged on one of the transverse side parts. In particular, the at least one holding arm may be assigned a drive device by means of which the at least one holding arm is able to be displaced in order to guide and hold the guide rope or the guide bar relative to the loading platform. The at least one holding arm therefore serves both to transmit a displacement movement to the guide rope or to the guide bar and to hold the guide rope or the guide bar in the corresponding position.

As an alternative to a holding arm, however, at least one, preferably two, holding frames may also be provided for guiding and holding the guide rope or the guide bar, wherein the at least one holding frame is arranged on one of the transverse side parts. In contrast to the at least one holding arm, the at least one holding frame may furthermore comprise at least one guide rail in which a portion of the guide rope or of the guide bar can be received so as to be guided directly or indirectly. For example, it is conceivable to fasten to each of the free ends of the guide rope a pin or the like, which may in turn be guided in the guide rails of two holding frames attached to the transverse side parts of the transport wagon. A fixing device (for example a clamping screw or the like) may additionally be provided on the pin, said fixing device being able to fix the portion of the guide rope relative to the guide rail as soon as this is desired. Moreover, a connecting part, for example in the form of a rigid bar, may be arranged between the pin acting as guide part and the respectively assigned portion of the guide rope, in order to further enlarge the strapping radius relative to the holding frame. The same functional principle may, of course, also be transferred to a guide bar.

Finally, the at least one holding arm or alternatively the at least one holding frame may be assigned a drive device by means of which the at least one holding arm or the portion of the guide rope or the guide bar that is received in the guide rail is able to be displaced relative to the loading platform. The drive device may comprise a mechanical or electric and/or hydraulic drive. A conceivable example of a variant comprises a drive chain which can be guided within the holding frame.

Consequently, the above-described embodiment of a transport wagon with its strapping system can be operable both manually by a single user who transfers for example the holding arm or the portions of the guide rope or the guide bar that are received in the guide rail into a desired position for securing the loaded cargo and secures the cargo in this position. Alternatively, however, the configuration with a drive device is also conceivable and advantageous in particular when a transport wagon for cargo that is particularly easy to operate is desired.

A corresponding drive device may be operated for example electrically, hydraulically or pneumatically. The drive device may also be designed to hold the holding arm or the respective portion of the guide rope or the guide bar in the desired position for securing the cargo. Alternatively or additionally, however, a securing system may also be provided, for example a device for hooking or latching the guide bar or the guide rope in the desired position.

According to an embodiment of the present invention, provision is made that at least the portions of the transverse side parts that comprise the conveying device of the strapping system are displaceable in a direction perpendicular to the loading platform relative to the loading platform. This solution makes it possible to tension cargo safely in different loading heights against the loading surface. Furthermore, it is not necessary to adapt the conveying device. Thus, in a configuration of the conveying device with a drive chain, it is, for example, not necessary for the length of the latter to be changed, but rather the entire conveying device with the associated portion of the transverse side part is displaced upward or downward relative to the loading platform.

In particular, the transverse side parts can be configured in a telescopic manner and have at least one drive device for displacement in a direction perpendicular to the loading platform relative to the loading platform. The drive device may be configured for example hydraulically, but alternative configurations, for example with an electric motor and toothed bars are likewise conceivable.

Provision may furthermore be made that at least one supporting bracket for supporting the conveying device is provided between the transverse side parts. It is specifically in the case of a loading surface with a length (in the direction of the longitudinal axis) of more than 10 meters that the supporting bracket serves for additionally supporting the at least one guide rope and/or the at least one guide bar of the conveying device. Accordingly, the supporting bracket can be mounted so as to be movable in particular also in the direction of the longitudinal axis of the loading platform, in order to orient the latter optimally in position depending on its loaded state. For example, it is conceivable to mount it by means of at least one roller on each of the longitudinal sides of the loading platform or on components that extend along the longitudinal sides of the loading platform.

The at least one supporting bracket may have a drive unit of the conveying device. Thus, specifically in the case of a conveying bar, the intrinsic weight of the conveying bar, given a corresponding length, can make it necessary for the supporting bracket also to be configured to guide said conveying bar, together with one or two conveying devices on the transverse sides of the transport wagon, around the cargo to be fixed on the loading surface. As in the case of the drive unit or the drive units on the transverse side parts, a holding frame having a drive chain or the like can be provided as drive unit.

Furthermore, the supporting bracket can likewise be configured to be displaceable in a direction perpendicularly to the loading platform, i.e., in terms of its height. A conceivable variant here is that at least a part of the supporting bracket is telescopic, for example the portions of the supporting bracket that extend in the direction perpendicularly to the loading platform.

In an alternative embodiment of the present invention, a deflection device may additionally be provided for deflecting at least one tensioning means, wherein the at least one tensioning means is guided at least partially in a direction substantially parallel to the longitudinal axis of the loading platform by means of the deflection device.

In practice it has been found that, for example, the tensioning device or at least a majority of its components can be received in a particularly space-saving manner and safely in the region of the underbody of the transport wagon and/or be attached thereto. In such a configuration, the maximum extent of the components of the tensioning device in the longitudinal direction (parallel to the longitudinal axis of the loading platform) is limited by the wheel axles of the transport wagon, however. Since, however, the region of the loading platform that is located above the wheel axles of the transport wagon is also intended to be used to receive and secure cargo, it is necessary to deflect at least one tensioning means at least partially from the region between the wheel axles (in which the tensioning device may be attached) into a region above the wheel axles. The deflection device is used for this purpose.

The latter may comprise in particular at least one pair of pulleys which are assigned to a tensioning means and which are capable of deflecting the assigned tensioning means in the desired way. To this end, the tensioning means, for example a tensioning strap, may be folded a first time by means of the first pulley and in this way deflected through 90°, wherein as a result of its being folded, the tensioning means no longer extends substantially transversely to the longitudinal axis of the loading platform but parallel thereto. By means of the second pulley, the tensioning means can be folded again and at the same time deflected through 90°, wherein, as a result of its being folded again, the tensioning means then no longer extends substantially parallel to the longitudinal axis of the loading platform but transversely thereto again. It is therefore possible for the cargo which is located above the wheel axles on the loading platform to be gripped and tensioned.

Figure 1A:
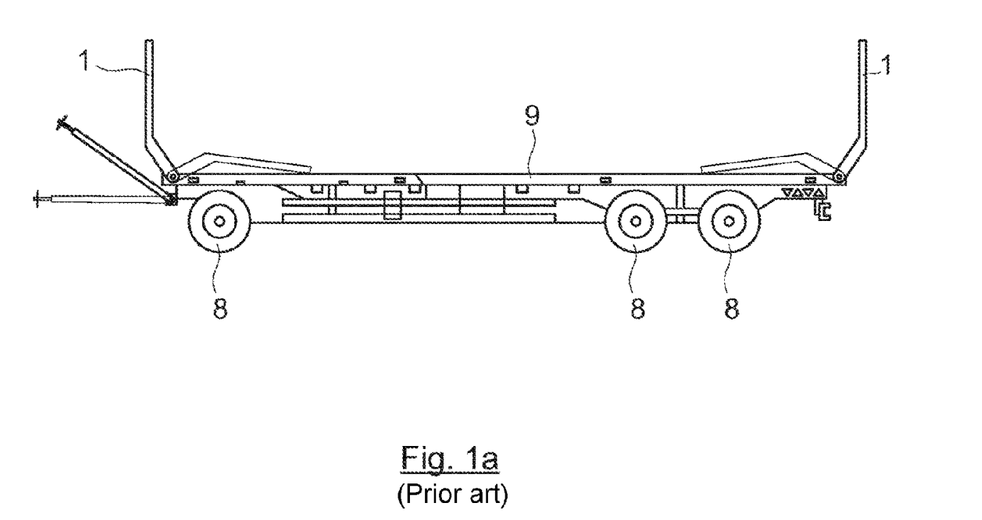
FIG. 1a is a right-side view of a common transport wagon.
Figure 1B:
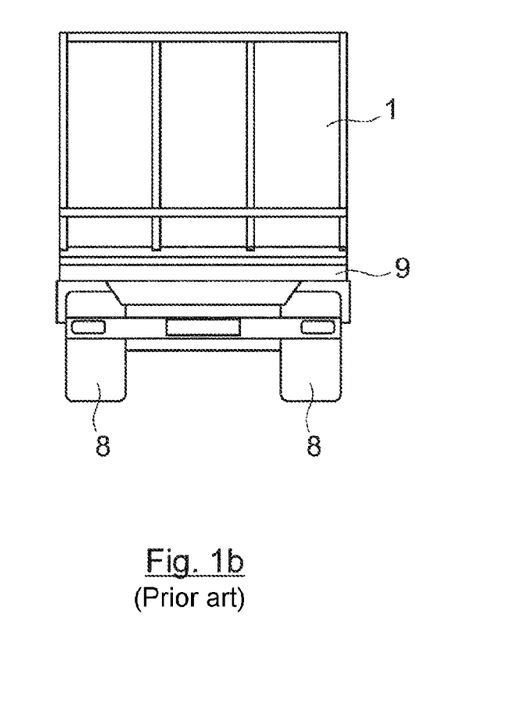
FIG. 1B is a rear view of a common transport wagon.

FIGS. 1a and 1b are a right-side and rear view of a common transport wagon. The transport wagon comprises a wagon frame 9 which, at the same time, also provides the loading platform for the cargo to be transported. The loading platform extends along its longitudinal axis L and is delimited at its frontal ends (to the left and right, or front and rear, in FIG. 1a) by transverse side parts 1. The wagon frame 9 is located, supported via the chassis and the wheel axles, above the wheels 8 of the transport wagon.

Figure 2A:
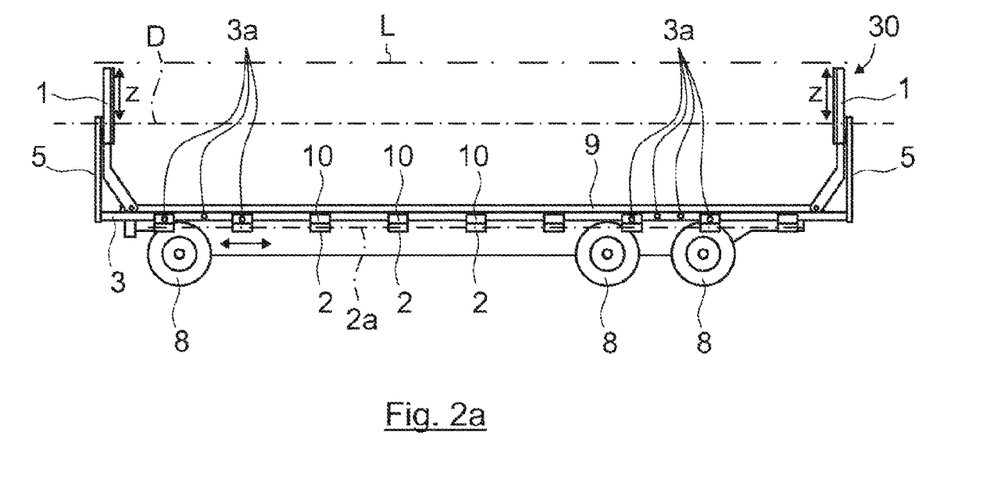
FIG. 2a is a right-side view of a transport wagon according to an embodiment of the present invention.
Figure 2B:
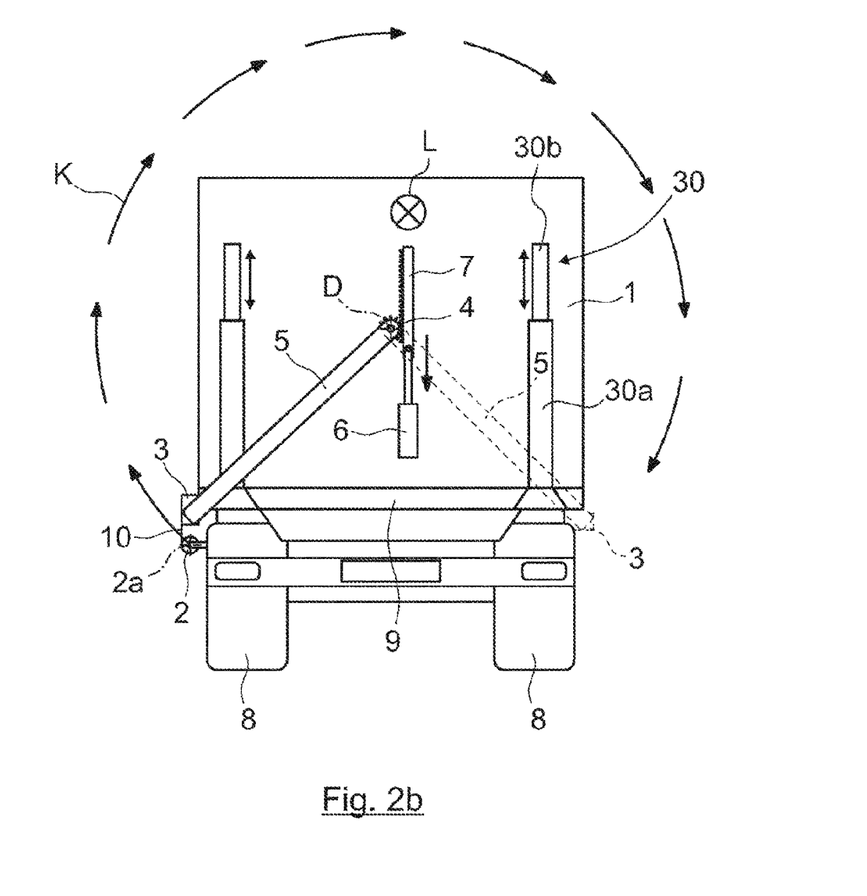
FIG. 2b is a rear view of a transport wagon according to an embodiment of the present invention.
Figure 3A:
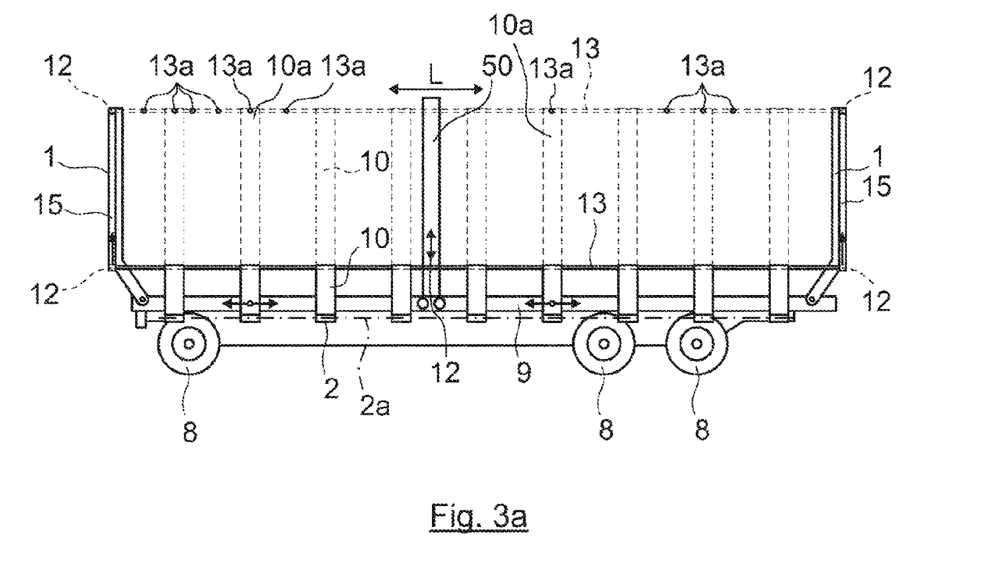
FIG. 3a is a right-side view of a transport wagon according to an embodiment of the present invention.
Figure 3B:
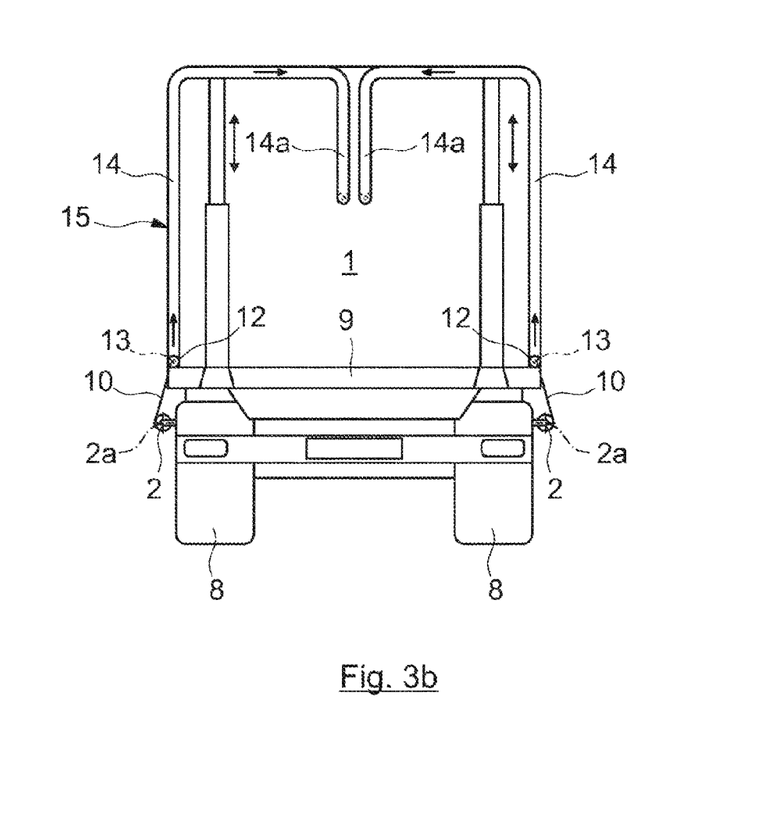
FIG. 3b is a rear view of a transport wagon according to an embodiment of the present invention.
Figure 3C:
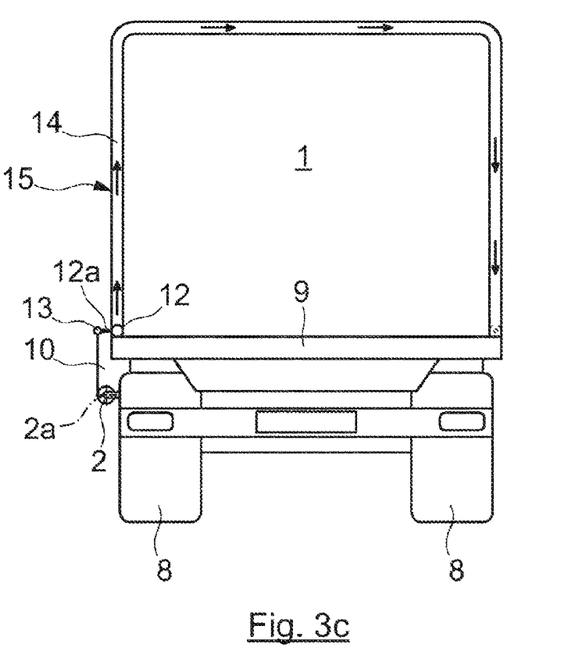
FIG. 3c is a rear view of a transport wagon according to an alternative embodiment of the present invention.
Figure 3D:
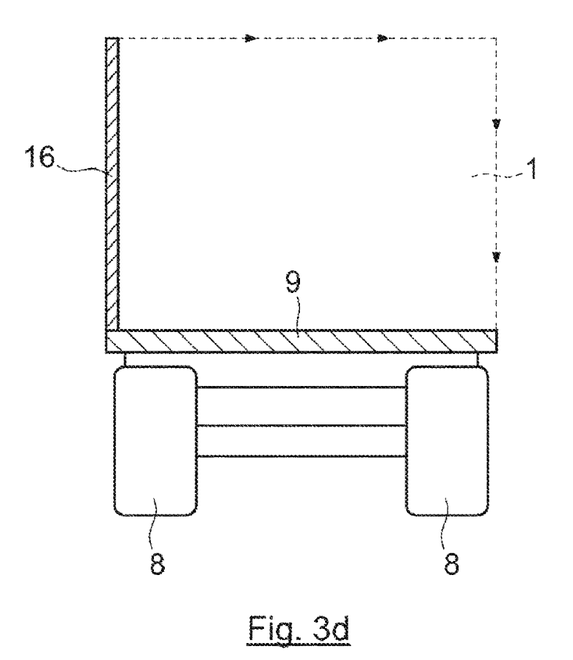
FIG. 3d is a rear view of a transport wagon according to the invention according to an alternative fourth embodiment.
Figure 4A:
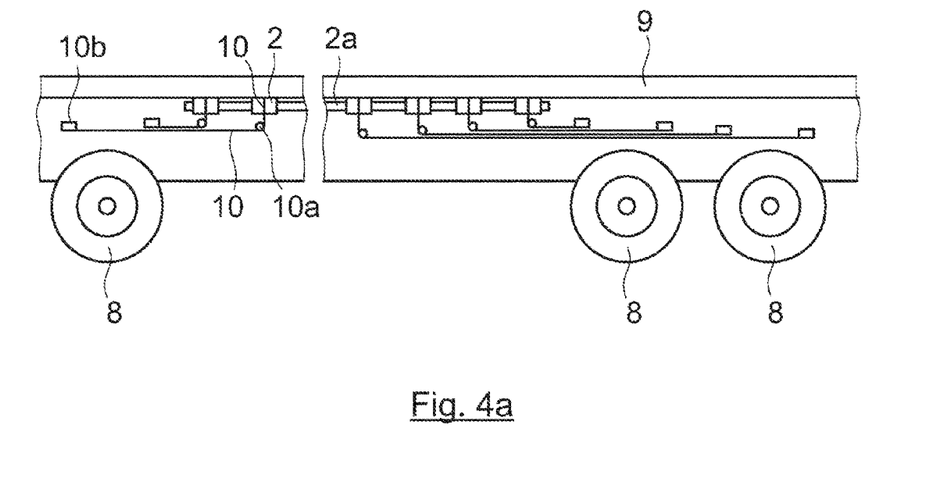
FIG. 4a is a partial right-side view of a transport wagon according to an alternative embodiment of the present invention.
Figure 4B:
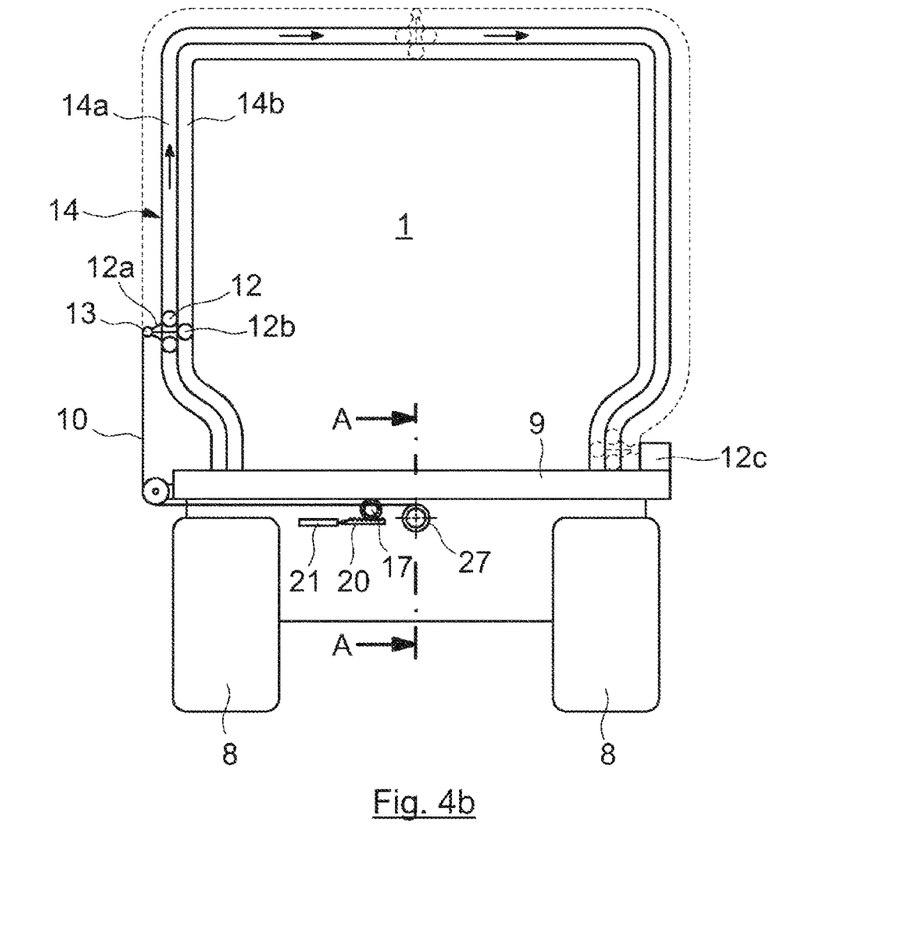
FIG. 4b is a rear view of a transport wagon according to an alternative embodiment of the present invention.
Figure 4C:
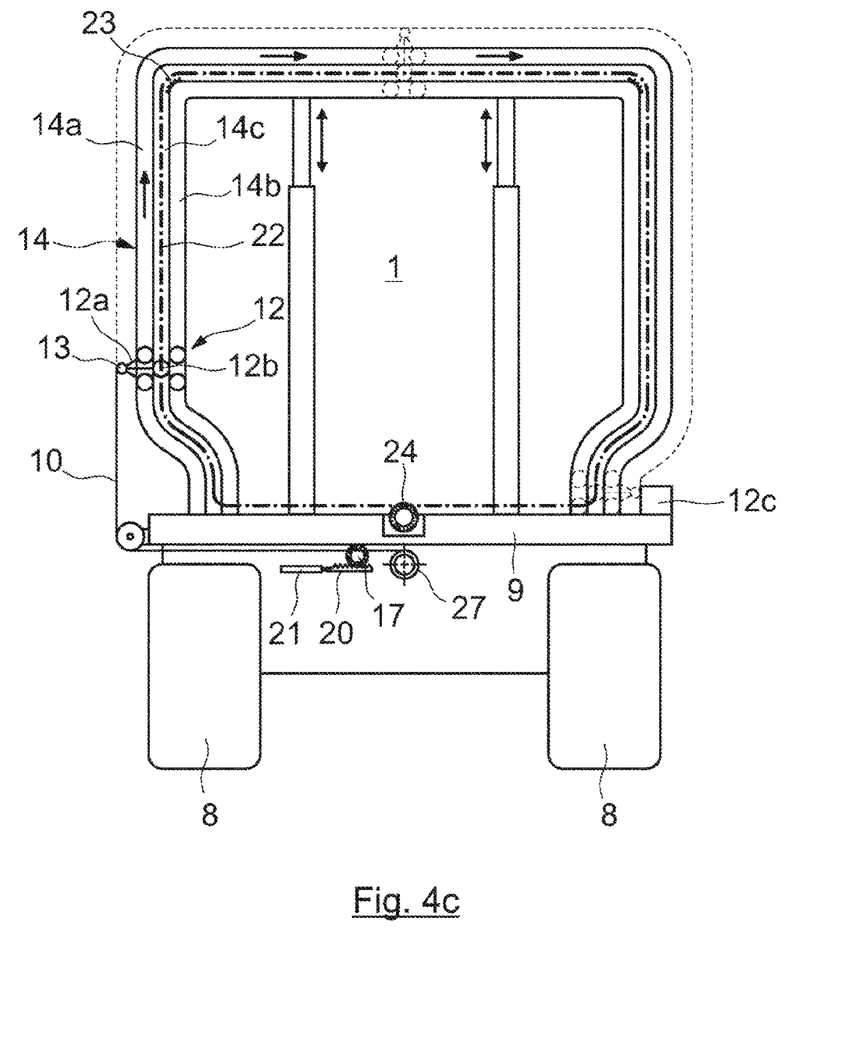
FIG. 4c is a rear view of a transport wagon according to an alternative embodiment of the present invention.
Figure 5:
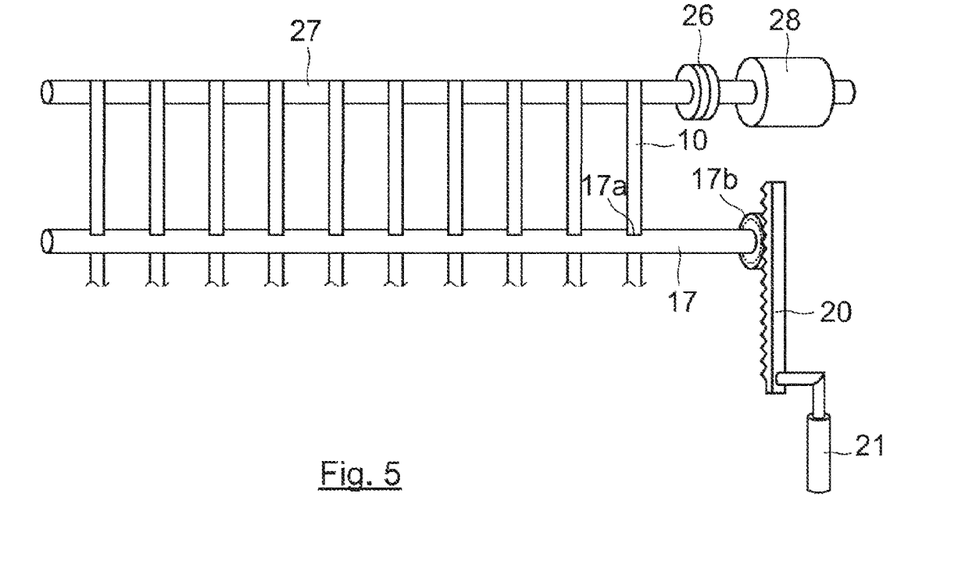
FIG. 5 is a perspective view of a tensioning device of a transport wagon according to an embodiment the present invention.
Figure 6:
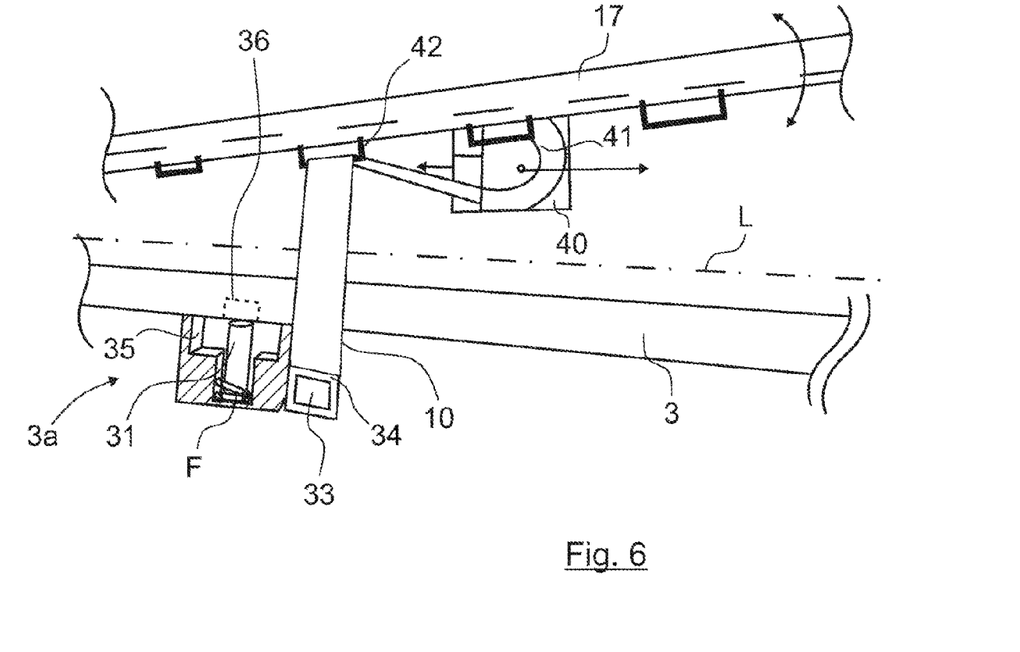
FIG. 6 is a perspective view of a tensioning device and a fastening device of a transport wagon according to an embodiment of the present invention.
Figure 7A:
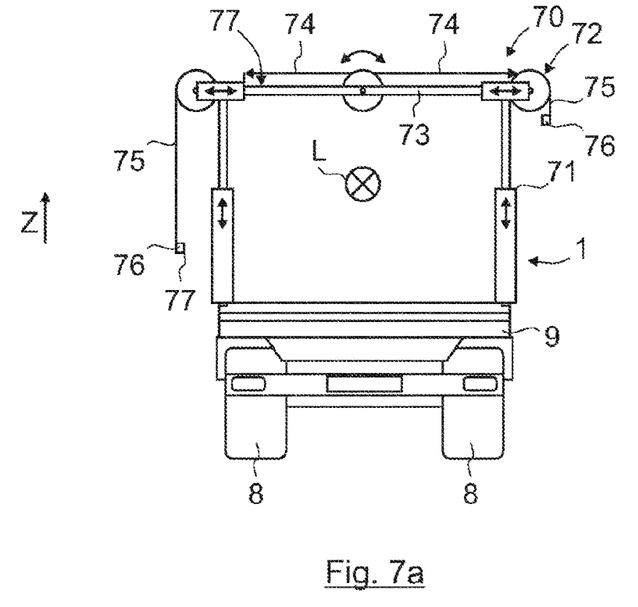
FIG. 7a is a rear view of a covering tarpaulin arrangement affixed to a transport wagon according to an embodiment of the present invention.
Figure 7B:
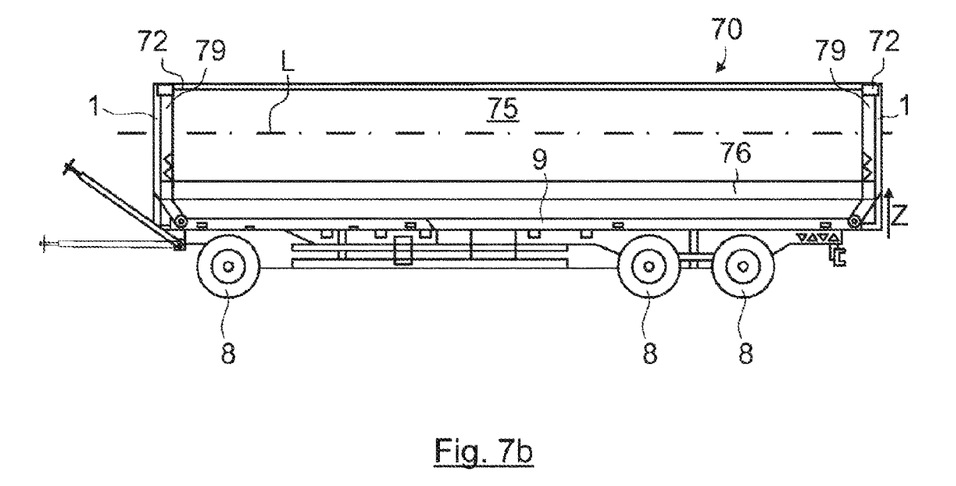
FIG. 7b is a right-side view of a covering tarpaulin arrangement affixed to a transport wagon according to an embodiment of the present invention.

FIGS. 2a and 2b show a right-side view and a rear view, respectively, of a transport wagon according to an embodiment of the present invention, while FIGS. 3a and 3b show a right-side view and a rear view, respectively, of an alternative embodiment of the present invention. FIGS. 3c and 3d show rear views of alternative embodiments of the present invention. FIGS. 4a through 4c illustrate rear partial right-side views (FIG. 4a), respectively, of alternative embodiments of the present invention, while FIG. 5 shows a perspective view of a tensioning device of a transport wagon according to an embodiment of the present invention. Finally, FIG. 6 shows a perspective view of a tensioning device and a fastening device of a transport wagon according to an embodiment of the present invention, while FIGS. 7a and 7b show a rear and right-side view of a covering tarpaulin arrangement 70 affixed to a transport wagon according to an embodiment of the present invention. Features that coincide have been referenced using the same reference signs.

In FIGS. 2a and 2b, a conveying device that comprises a holding arm 5 is provided on each transverse side part 1 of the transport wagon. Between the holding arms 5, a guide bar 3, which performs a circular displacement motion K about an axis of rotation D (cf. FIG. 2b) in the event of a rotational movement of the holding arms 5, extends along the longitudinal extent of the transport wagon.

As is indicated in FIG. 2a by the arrows Z and is more clearly apparent in FIG. 2b, the transverse side parts 1 are configured to displace the transverse side parts 1 up and down, i.e. in a direction Z perpendicularly to the loading platform, relative to the loading platform. To this end, a telescopic device 30, for example, can be provided, wherein a first part 30a is firmly connected to the vehicle frame 9 and a second part 30b that is able to telescope with respect thereto is firmly connected to the associated transverse side part 1.

Since, in this embodiment, the entire transverse side part can be displaced relative to the loading platform, it is not necessary to make any change to the conveying device of the transport wagon. In alternative embodiments, it is also possible for only a portion of the transverse side parts to be displaceable relative to the loading platform. This is likewise the portion on which the conveying device of the transport wagon is fitted.

By means of the vertically adjustable transverse side parts, additional adaptation of the transport wagon and in particular of the tensioning device to different loaded states can be achieved.

The displacement can take place by means of a drive, for example by means of an electric motor or a hydraulic or pneumatic drive.

The free ends of a plurality of strap-like tensioning means are fastened to the guide bar 3. In the event of displacement of the guide bar 3, these are accordingly moved along therewith. The plurality of strap-like tensioning means are in turn wound onto strap rollers 2 and, as a result of the circular displacement motion K of the guide bar, can be unwound from the strap rollers 2. To this end, the strap rollers 2 are rotatably arranged on an axle 2a.

The two transverse side parts 1 support not only the holding arms 5 of the conveying device but also a drive device provided therefor, which, in the illustrated example, is made up of a hydraulic cylinder 6 and a toothed drive rod 7 and causes a pivoting movement of the holding arm 5 about the axis of rotation D by force transmission at the force application point 4.

In principle, however, it is likewise conceivable, rather than the drive device shown, to provide an alternative system for driving the holding arms 5, for example an electric motor, or a hydraulic or pneumatic drive.

As is furthermore indicated in FIG. 2a, in the embodiment shown, the strap-like tensioning means 10 wound onto the strap rollers 2 can also be moved in the direction of the longitudinal axis L relative to the loading platform. To this end, the strap rollers can be mounted so as to be freely movable on a separate shaft or on a component, extending in the longitudinal direction L, of the wagon frame 9.

The free ends of the tensioning means 10 can be released or uncoupled from the guide bar 3 (or from a guide rope as in the alternative embodiment in FIGS. 3a and 3b) and be connected to it again in a new relative position. To this end, as indicated in FIG. 2a, defined fastening points 3a can be provided on the guide bar 3 (and analogously fastening points 13a on the guide rope 13), and these may be provided so as to be distributed at equal spacings from one another or irregularly. Thus, it is conceivable for more fastening points to be provided at shorter spacings from one another in loading zones in which usually relatively heavy loads are loaded, for example in the front region in the direction of travel, than in loading zones in which usually less heavy loads are intended to be loaded. Expediently, more fastening points 3a than tensioning means 2 can be provided, in order to allow the tensioning means 2 to be repositioned. The number of fastening points can in this case be a multiple of the tensioning means 2; for example, twice, three times or four times as many fastening points 3a can be provided, or more.

FIG. 6 shows, by way of example, a design variant of a fastening point 3a on a guide bar 3; further fastening points have been omitted in order to simplify the illustration in FIG. 6. In the design variant shown, the cut-away fastening point 3 comprises a fastening pin 31, resiliently pretensioned by means of a spring F (coil spring, leaf spring or other elastic element), in a recess 32, said fastening pin 31 being resiliently pretensioned against the guide bar 3. The tensioning means 10, a tensioning strap in the embodiment shown, comprises, at its free end, a recess 33 is provided in a reinforced region 34, in which recess 33 the fastening pin 31 is able to engage in a fastened state. The tensioning means 10 is consequently pushed, with its free end at the fastening point 3a, into the gap 35 provided between the fastening pin 31 and guide bar 3 and displaces the resiliently pretensioned pin 31. The latter then engages in the recess 33 and thus secures the tensioning means 10. For better fixing, an additional securing recess 36 can additionally be provided in the guide bar 3, into which the fastening pin can be pushed (manually or as a result of the resilient pretensioning), in order to prevent undesired releasing. Depending on the configuration, an additional actuating element can be provided, by means of which the pin can be returned into an unsecured position again, in which the tensioning means 10 can be released.

Alternative options for the releasable coupling of the tensioning means 10 to the guide bar 3 are, of course, likewise conceivable. In the configuration with a guide rope 13, too, other solutions are conceivable, for example snap hooks or the like at the free ends of the tensioning means 10 and eyes for hooking in as fastening points 13a on the guide rope 13. A reversal of the variants shown and described by way of example is also conceivable, for example a recess in the guide bar 3, into which a fastening member on the tensioning means 10 can be latched or hooks on the guide rope as fastening points which can engage for fixing purposes in recesses in the tensioning means 10.

In the second embodiment in FIGS. 3a and 3b, no holding arms 5 that are moved about the axis of rotation D are arranged in the region of the transverse side parts 1. Rather, the transverse side parts each comprise a holding frame 15, which may have one or more guide rails 14 (cf. FIG. 3b). Furthermore, in contrast to the first embodiment, as already indicated above, no guide bar is tensioned between the two holding frames 15, but rather a guide rope 13, which is connected with its end portions to guide parts 12. The guide parts 12, for example in the form of pins or the like, are in turn received in the guide rails 14 of the holding frame 15 so as to be displaceable and guided. Displacement of the guide parts 12 in the front and rear holding frame 15 causes displacement of the guide rope 13 in a similar manner as in the first variant of the invention, with the result that the free ends of the strap-like tensioning means 10 connected thereto are likewise accordingly displaced.

The guide parts 12 may of course also be configured so as to be fixable in the guide rails 14, for example by providing a fixing mechanism in the form of an adjusting screw or the like.

In this variant, too, the strap-like tensioning means 10 are rolled onto strap rollers 2 and can be unrolled therefrom.

In a particularly convenient embodiment, provision may be made that the strap rollers 2 in both variants of the present invention are part of a tensioning device for tensioning the strap-like tensioning means. Such a tensioning device may comprise for example a hollow shaft and an axle arranged therein, on which the at least one tensioning means is able to be wound and unwound by a rotational movement of the axle relative to the hollow shaft. In this case, the rotational movement of the axle may be driven for example by a motor or be manually introduced.

As an alternative to this design variant of a tensioning device, a further embodiment is illustrated in FIG. 5. The tensioning device shown therein comprises, instead of the axle 2a, a driven shaft 27 for winding and unwinding the strap-like tensioning means 10. The strap-like tensioning means 10, as in other embodiments, may be wound onto strap rollers which are connected to the shaft 27 for conjoint rotation or connected at one of their free ends to the shaft 27. The shaft 27 may be driven for example hydraulically via a schematically illustrated hydraulic drive 28. Torque limiters 26, for example a ratchet coupling or slipping clutch or the like, which serve for overload protection of the shaft 27 and the associated drive 28, may be provided at the interface between the shaft 27 and the tensioning means 10.

In addition to the shaft 27, a tensioning shaft 17, as it is known, is provided, which serves for automatic tensioning and in particular for securing the tensioned strap-like tensioning means 10. To this end, the tensioning shaft 17 has one or more slot-like openings 17a through which the strap-like tensioning means 10 can extend through the shaft 27. In a starting position, the strap-like tensioning means 10 extend straight through the tensioning shaft 17.

If, however, the tensioning shaft 17 is intended to be used for retensioning or in particular for securing the strap-like tensioning means 10, the tensioning shaft 17 is rotated through a predetermined angle about its longitudinal axis, with the result that the strap-like tensioning means 10 extending through the at least one slot-like opening 17a are made to bear against the outer surface of the tensioning shaft 17.

For rotating the tensioning shaft 17, use may be made, for example, as shown in FIG. 5, of an additional drive, which, in the embodiment illustrated, comprises a toothed rod 20 which can be set in translational movement by means of a hydraulic cylinder 21. A gearwheel 17b engaged therewith, which is connected to the tensioning shaft 17 or integrally formed thereon, is transferred into rotational movement as a result.

In a desired position of the tensioning shaft 17 in which the strap-like tensioning means 10 are tensioned and bear against the outer surface of the tensioning shaft 17, the tensioning shaft 17 itself or a drive component of the tensioning shaft 17 can be secured in its position. In this case, for example mechanical locking of the toothed rod 20 is conceivable, which can be locked for example by a pin or the like to the wagon frame 9. Alternatively, however, it is also conceivable to provide on the hydraulic drive a corresponding check valve which holds the toothed rod 20 reliably in its desired position. Further alternative possible configurations are of course likewise conceivable.

In a further advantageous variant (shown in FIG. 6), the tensioning means, in particular tensioning straps 10, are received in a roller box, i.e. are rolled up therein. The latter can comprise a spring 41, which is in a relaxed state when the tensioning means 10 is completely rolled up and is transferred into a tensioned state when the latter is unrolled. Thus, the spring 41 serves for the automatic retensioning of the tensioning means 10. Alternatively or additionally, the retensioning can also take place by means of an additional drive, wherein each tensioning means can be assigned a separate, variably controllable drive. Such an additional drive can also assume the function of securing the tensioned tensioning means.

For additionally securing the tensioning means 10 in a desired position and for retensioning, according to a further embodiment variant (cf. FIG. 6), as an alternative to the slot-like opening 17a, tensioning brackets 42 are provided on the tensioning shaft 17, through which tensioning brackets 42 the tensioning means 10 can be guided. In a starting position, the strap-like tensioning means 10 extend straight through the associated tensioning brackets 42 of the tensioning shaft 17. If the tensioning means 10 are intended to be retensioned and in this way secured (static friction), the tensioning shaft 17 is in turn rotated through a predetermined angle about its longitudinal axis by means of a drive, with the result that the strap-like tensioning means 10 extending through the tensioning brackets 42 are made to bear against the outer surface of the tensioning shaft 17.

In order to ensure that the strap-like tensioning means 10 bear securely against the outer surface of the tensioning shaft 17 in order to secure the tensioning means 10, said tensioning shaft 17 may provide improved static friction at least in the regions in which the strap-like tensioning means 10 can be made to bear. This can occur as a result of a corresponding surface structure of the tensioning shaft itself or as a result of additional elements that may be attached to the tensioning shaft. For example, the tensioning shaft may be roughened on its outer peripheral surface, it may have a coating (for example a rubber coating), or shell-like rubber elements, elements with spikes or the like may be attached to the tensioning shaft 17. The additional elements, for example shell-like rubber elements, may be attached to the tensioning shaft 17 for example by screwing, adhesive bonding or the like.

In particular in the embodiments in which such an additional tensioning shaft 17 is intended to be provided for securing the strap-like tensioning means 10, an arrangement of the tensioning device on the underbody of the transport wagon is particularly favorable and space-saving. Such an arrangement is shown for example in FIG. 4b. Furthermore, by means of an additional tensioning shaft 17, retensioning of the tensioning means may take place at any time without the fixing of the tensioning means having to be released for this purpose.

As shown in FIG. 4a, however, which is a view of FIG. 4b in section along the line A-A, a further technical problem results therefrom. Thus in a corresponding arrangement, the maximum extent of the components of the tensioning devices in the longitudinal direction (i.e. parallel to the longitudinal axis of the loading platform) through the wheel axles of the wheels 8 of the transport wagon is limited. Since, however, the region of the loading platform is also intended to be used to receive and secure cargo which is located above the wheel axles of the wheels 8 of the transport wagon, it is necessary to deflect at least one of the strap-like tensioning means 10 at least partially from the region between the wheel axles into a region above the wheel axles. To this end, according to the invention, a deflection device may be provided.

The latter comprises, in the embodiment illustrated, for each strap-like tensioning means 10 to be deflected, a pair of pulleys which serve for deflecting and folding the strap-like tensioning means 10. Thus a strap-like tensioning means 10 which extends substantially perpendicularly to the longitudinal axis of the transport wagon from the region between the wheel axles, is folded by a first pulley 10a and deflected through 90° such that it now extends substantially parallel to the longitudinal axis of the transport wagon and thus also to the loading platform (to the front or rear). By means of the second pulley 10b, the tensioning means 10 can be folded again and at the same time deflected through 90° such that the strap-like tensioning means 10 now extends transversely again, i.e. approximately at a 90° angle, to the longitudinal axis of the loading platform. Proceeding therefrom, the deflected tensioning means 10 can also be used for example in the region above the wheel axles, i.e. above the wheels 8, to tension corresponding cargo.

Rather than the two guide rails 14 shown in FIG. 3b, which have a portion which projects into the cargo space of the transport wagon (portion 14a in FIG. 3b), it is also possible for a single peripheral guide rail or a substantially peripheral guide rail to be provided, as illustrated for example in FIG. 3c. Furthermore, as is likewise shown in the embodiment in FIG. 3c, a connecting part 12a may be provided between the respective guide part 12 and the guide rope 13, said connecting part 12a providing a larger strapping radius through the strap-like tensioning means (cf. FIG. 3c). Such a connecting part 12a may be configured for example as a rigid bar and is connected at one end to the guide part 12, while at the other end it is configured to receive a portion of the guide rope 13.

In the embodiment in FIG. 4b and the embodiment in FIG. 4c, it is apparent that, instead of a single guide rail, at least two or even three rails 14a, 14b and 14c running adjacent to one another are provided as the guide rail 14. The additional rails 14b serve in this case to guide one or more force compensation rollers 12b (two in FIG. 4c), which is/are intended to prevent tilting of the connecting part 12a and thus sagging of the guide rope. To this end, via these rollers, a holding force opposing a tilting movement is introduced into the connecting part 12a connected thereto. The configuration as rollers is advantageous in this case in particular since said rollers can be guided with low friction in the guide rail 14b, if the guide rope 13 is intended to be displaced. In this case, a single force compensation roller 12b (FIG. 4b) or a plurality of force compensation rollers 12b (FIG. 4c) may be provided. In the same way, the guide part 12 itself may be provided as a roller or with rollers in order to ensure that it runs in the guide rail 14a with low friction.

As shown in FIG. 4c, the third guide rail 14c can be used for receiving and guiding a drive means, such as a drive chain 22 in the present case. In this case, pulleys 23 for the drive chain 22 may be provided in the deflection regions in which the guide rail 14a has a radius, alternatively or additionally to the radius provided. The drive chain 22 may, as shown, be driven via at least one drive wheel 24. The pulleys 23 and the at least one drive wheel 24 may additionally be provided with an external toothing in order to permit a defined engagement in the drive chain 22 and low-loss force transmission. The drive chain 22 itself is in turn connected to the connecting part 12a, the guide part 12 and/or the force compensation rollers 12b. The arrangement shown in FIG. 4c, in which the drive force is introduced between the guide parts 12 configured in the form of rollers and the force compensation rollers 12b, is particularly advantageous in order to avoid jamming of the guided arrangement.

A further detail of the embodiment in FIGS. 4b and 4c is apparent from the offset of the guide rail arrangement 14 in the transition region to the loading platform. This serves to secure the guide arrangement, in particular the connecting part 12a, which, in its starting position (when the load is unsecured) and in its operating position (when the load is secured and the guide rope 13 or the tensioning means 10 attached thereto are secured), does not project substantially beyond the lateral dimensions of the loading platform and is thus protected from undesired tearing or bending.

The guide rope 13 and/or the tensioning means 10 may be fixed in very different ways, for example mechanically by a pin or the like (indicated by the fixing unit 12c) or by the conveying device, which in turn may be secured in the desired position, as already described above in connection with the tensioning device in FIG. 5.

As already indicated above, it may also be sufficient for the guide rail 14 extend around sufficiently far from a longitudinal face of the transport wagon to the opposite longitudinal face that the load is fixed or the guide rope can be reached by an operator standing on the ground.

Also, in a further embodiment according to FIG. 3d, it is conceivable for a rigid side wall 16 to be provided on one of the longitudinal sides, said rigid side wall 16 delimiting the loading platform of the wagon frame 9 on one of its longitudinal sides. From this rigid side wall, the tensioning means can be wrapped around at least to such an extent that the load is fixed and the guide rope can be reached by an operator standing on the ground. According to the invention, both a conveying device with at least one holding arm (cf. FIGS. 2a and 2b) and a conveying device with at least one holding frame (cf. FIGS. 3a to 3c) can be used for partially or completely wrapping around the loaded cargo.

The fixing of the tensioning means in the desired position may be achieved in each of the above-described embodiments with the aid of the conveying device itself, which holds said tensioning means in the desired position, or by means of an additional fixing unit. The latter may, in particular, be configured as a mechanical fixing unit 12c (cf. FIGS. 4a and 4b), which may comprise a pin, a hook or the like.

Of course, a guide rope may also be used instead of a guide bar in the first variant in FIGS. 2a and 2b. Equally, vice versa, it may also be expedient to provide a guide bar instead of the guide rope in the second variant in FIGS. 3a to 3d.

Finally, FIG. 3 shows a further particularity of the present invention. In particular in transport wagons having a loading area with a length of 10 meters or more in the direction of the longitudinal axis, it may be expedient for the guide bar 3 or the guide rope 13 to be supported via an additional supporting bracket 50 which is arranged between the transverse side parts. Said supporting bracket 50 can be connected to the transport wagon fixedly in a position or be movable in the direction of the longitudinal axis L relative to the loading area, as indicated by a double arrow in FIG. 3a. The supporting bracket 50 can be moved correspondingly by means of an actuable drive (not illustrated) or manually by the user. The supporting bracket can also be secured in a desired position, for example via the drive or additional securing in the form of securing means such as pins or the like, which can fix the supporting bracket, in a predetermined position of the latter, to the wagon frame.

In the same way as the transverse side parts, the supporting bracket 50 can have a conveying device with at least one holding frame (cf. FIGS. 3a to 3c) with a guide part 12 in order to be able to displace the guide bar or the guide rope accordingly (indicated by the arrow in FIG. 3a). Furthermore, in the same way as the transverse side parts, it can be adjustable in a direction Z perpendicularly to the loading platform; in particular, as shown, the struts, extending in the direction Z, of the supporting bracket 50 can be configured in a telescopic manner. In this way, uniform adaptation to different loaded states can be achieved.

By way of the present invention it is advantageously possible to ensure that a single user can tension a plurality of strap-like tensioning means simultaneously around the cargo loaded on the loading platform in order to secure it. As a result, the drawback known from the prior art of a great deal of effort for securing the cargo is avoided, while at the same time improved flexibility of the known tensioning means for securing very different loads is provided.

In order to additionally protect the loaded and secured cargo from the weather, in particular rain, an automatic tarpaulin cover can additionally be provided, as is known for example from the prior art (cf. for example U.S. Pat. No. 8,226,150 B1 or U.S. Pat. No. 7,189,042 B1).

In a conceivable design variant of such a tarpaulin cover, it is likewise possible for the tarpaulin cover to be coupled to the strapping system in order in this way to simultaneously secure the loaded cargo with the tensioning means and to protect the loaded cargo from rain. Thus, it is possible for example for an (additional) covering tarpaulin, in the same way as the tensioning means, to be carried along by the conveying unit of the strapping system from a longitudinal side of the loading platform and to be guided at least partially around the loaded cargo.

By way of example, a further alternative configuration of a covering tarpaulin arrangement 70 is shown in FIGS. 7a and 7b. Accordingly, telescopic arms 71 are attached to the transverse side parts 1, and a mounting bracket 72 is fastened to each of said arms 71. The two mounting brackets 72 are in turn connected to crossbars 73 in order to apply or fasten a covering tarpaulin 74 from above. The crossbars 73 are configured in a telescopic manner in the embodiment variant shown and their extent transversely, in particular perpendicularly, to the longitudinal axis L can thus be lengthened or shortened. To this end, the crossbars 73 are provided with at least two parts that are movable relative to one another, wherein one of the crossbar parts is received partially in the respectively other crossbar part at least in a retracted state. The upper covering tarpaulin 74 can be configured to be unrollable and accordingly be further unrolled or rolled up again.

This design variant with an extent lengthened transversely to the longitudinal axis L makes it possible for the conveying unit not to be impeded while tensioning the tensioning means of the strapping system. In this case, the upper covering tarpaulin 74 can be unrolled from a shaft that is located on one of the mounting brackets 72. Alternatively, the upper covering tarpaulin 74 can also be unrolled from, and rolled back up on, a shaft that is arranged centrally between the mounting brackets 72 (and extends in the longitudinal direction L) axisymmetrically with respect to the longitudinal axis L (cf. FIG. 7a).

As an alternative to an upper covering tarpaulin that is able to be rolled up and unrolled, the covering tarpaulin can also be configured with an overlapping pocket (similar to a bellows) which is dimensioned such that the upper covering tarpaulin, in the fully extended state of the crossbar parts, is carried along by the latter and is tensioned in the direction transversely, in particular perpendicularly, to the longitudinal axis L. In a retracted state, the overlapping pocket is formed, i.e. the covering tarpaulin has a region in which parts of the covering tarpaulin overlap. Thus, the overlapping pocket can be formed in particular in the region in which the one crossbar part is received in the respectively other crossbar part. In this case, the one crossbar part that is movable relative to the other crossbar part can carry along the upper covering tarpaulin during its retraction movement into the other crossbar part and as a result form the overlapping pocket. The upper covering tarpaulin can also be in the form of a rigid roof part and additionally have flexible portions for forming an overlapping pocket as described above.

Further alternative solutions, for example with an elastic upper covering tarpaulin or elastic portions of the covering tarpaulin are, of course, likewise conceivable.

Depending on the configuration of the upper covering tarpaulin 74 and its mechanism for adapting its extent in a direction transversely to the longitudinal axis L, it is possible for both lateral ends of the covering tarpaulin to be fastened fixedly to the associated mounting bracket 72, for the one free end of the upper covering tarpaulin 74 to be releasably fastenable to the respectively other mounting bracket 72, or for both symmetrically arranged free ends of the upper covering tarpaulin 74 to be releasably fastenable to the two associated mounting brackets 72.

The side parts 75 of the covering tarpaulin arrangement 70 can be rolled up on and unrolled from a shaft that is located on or in the mounting brackets 72, for example by means of an electric motor as drive. At the lower end of the side parts 75, a holding bar 76 can additionally be located, which allows a defined position and tensioning of the side parts 75. In the unrolled state, the free ends of the side parts 75 can be releasably fastenable to the loading platform or a region adjacent thereto.

Like the free end(s) of the upper covering tarpaulin 74, the free ends of the side parts 75 can also be fastened releasably for example by hooks 77 or the like.

The upper covering tarpaulin 74 and the side parts 75 can be rolled up and unrolled by means of a drive, for example an electric motor or the like. Manual rolling up and unrolling is also conceivable. Furthermore it is also possible to provide, in the associated shafts onto which the parts 74, 75 of the covering tarpaulin arrangement 70 are rolled, a spring system for automatically returning the unrolled tarpaulin part (return spring), for example in conjunction with the strap-like tensioning means described above.

On the transverse side parts 1, it is furthermore possible to provide running rails 79 in which the ends of the holding bars 76 and/or alternative portions of the side parts 75 are guided. The same goes for the guiding of the upper covering tarpaulin 74.

What is claimed is:

1. A transport wagon comprising:
    a loading platform configured to have a loaded state, wherein in the loaded state, cargo may be loaded onto the loading platform and wherein the loading platform extends along a longitudinal axis (L);
    a strapping system configured to secure the cargo on the loading platform, wherein the strapping system comprises at least one tensioning means (10) configured to be guided, with the aid of a conveying device, at least partially around the cargo loaded onto the loading platform thereby tensioning the cargo against the loading platform;
    wherein the loading platform is delimited at a frontal end by transverse side parts (1) comprising the conveying device of the strapping system; and
    wherein the at least one tensioning means (10) is affixed to the transport wagon and configured to move along the longitudinal axis (L) relative to the loading platform.

2. The transport wagon of claim 1,
    wherein the at least one tensioning means (10) of the strapping system is arranged along a longitudinal side of the loading platform and configured to be guided by the conveying device at least partially in a direction transversely to the longitudinal side of the transport wagon around the cargo loaded on the loading platform.

3. The transport wagon of claim 1, wherein the at least one tensioning means (10) is configured to be variably coupled to and uncoupled from the conveying device.

4. The transport wagon of claim 1, wherein the conveying device comprises a plurality of fastening points (3a, 13a) distributed along the longitudinal axis (L), wherein the at least one tensioning means (10) is configured to be variably coupled to and uncoupled from the conveying device.

5. The transport wagon of claim 4, wherein one or more of the plurality of fastening points (3a, 13a) of the conveying device comprises a resiliently pretensioned fastening member (31) configured to cooperate with a corresponding recess (33) in the at least one tensioning means (10) to fasten the at least one tensioning means (10).

6. The transport wagon of claim 1, wherein the strapping system comprises at least one tensioning device for tensioning the at least one tensioning means (10).

7. The transport wagon of claim 6, wherein the at least one tensioning device comprises a tensioning shaft (17) which is rotatable about its longitudinal axis and on which the at least one tensioning means (10) is configured to be at least partially wound and unwound by rotating the tensioning shaft (17).

8. The transport wagon of claim 6, wherein, in a region in which the at least one tensioning means (10) is able to be wound onto and unwound from a component of the at least one tensioning device, the at least one tensioning device provides a greater degree of static friction between the component of the at least one tensioning device and the at least one tensioning means (10).

9. The transport wagon of claim 6, wherein the at least one tensioning device comprises a drive unit (28) for driving in rotation and optionally an overload safety device.

10. The transport wagon of claim 6, wherein the tensioning device comprises a tensioning bracket (42) for retensioning the at least one tensioning means (10).

11. The transport wagon of claim 10, wherein the conveying device comprises at least one of a guide rope (13) or guide bar (3) connected to the at least one tensioning means (10) such that the at least one tensioning means (10) is guided at least partially around the cargo loaded onto the loading platform by means of at least one of the guide rope (13) or the guide bar (3).

12. The transport wagon of claim 11, wherein at least one portion of the transverse side parts (1), which comprise the conveying device of the strapping system, is movable in a direction (Z) perpendicular to the loading platform relative to the loading platform.

13. A transport wagon, comprising
A loading platform configured to have a loaded state, wherein in the loaded state, cargo may be loaded onto the loading platform and wherein the loading platform extends along a longitudinal axis (L);
a strapping system configured to secure the cargo on the loading platform, wherein the strapping system comprises at least one tensioning means (10) configured to be guided, with the aid of a conveying device, at least partially around the cargo loaded onto the loading platform in thereby tensioning the cargo against the loading platform;
wherein the loading platform is delimited at a frontal end by transverse side parts (1) comprising the conveying device of the strapping system and
wherein the transverse side parts (1) are configured at least partially in a telescopic manner and comprise at least one drive device for moving in a direction (Z) perpendicular to the loading platform relative to the loading platform.

14. The transport wagon of claim 13, wherein at least one supporting bracket (50) for supporting the conveying device is provided between the transverse side parts (1).

15. The transport wagon of claim 14, wherein the at least one supporting bracket (50) comprises a drive unit of the conveying device.

16. The transport wagon of claim 13, wherein the at least one tensioning means (10) is affixed to the transport wagon and configured to move along the longitudinal axis (L) relative to the loading platform.

17. A transport wagon, comprising
a loading platform configured to have a loaded state, wherein in the loaded state, cargo may be loaded onto the loading platform and wherein the loading platform extends along a longitudinal axis (L); and
a strapping system configured to secure the cargo on the loading platform, wherein the strapping system comprises at least one tensioning means (10) configured to be be guided, with the aid of an associated conveying device, at least partially around the cargo loaded onto the loading platform in thereby tensioning the cargo against the loading platform;
wherein the loading platform is delimited at a frontal end by transverse side parts (1) comprising the conveying device of the strapping system,
wherein the at least one tensioning means (10) is affixed to the transport wagon and configured to move along the longitudinal axis (L) relative to the loading platform, and
wherein the transverse side parts (1) are configured at least partially in a telescopic manner and comprise at least one drive device for moving in a direction (Z) perpendicular to the loading platform relative to the loading platform.

18. The transport wagon of claim 17, wherein the at least one tensioning device comprises a drive unit (28) for driving in rotation and optionally an overload safety device.

19. The transport wagon of claim 17, wherein the at least one tensioning device comprises a tensioning bracket (42) for retensioning the at least one tensioning means (10).

20. The transport wagon of claim 19, wherein the conveying device comprises at least one of a guide rope (13) or guide bar (3) connected to the at least one tensioning means (10) such that the at least one tensioning means (10) is guided at least partially around the cargo loaded onto the loading platform by means of at least one of the guide rope (13) or the guide bar (3).

* * * * *